(12) United States Patent
Khurana

(10) Patent No.: US 12,721,331 B2
(45) Date of Patent: Sep. 1, 2026

(54) DEVICE AND PROCESS FOR TRAPPING AND COMPRESSING ORGANISMS

(71) Applicant: Vikas Khurana, South Abington Township, PA (US)

(72) Inventor: Vikas Khurana, South Abington Township, PA (US)

( * ) Notice: Subject to any disclaimer, the term of this patent is extended or adjusted under 35 U.S.C. 154(b) by 0 days.

(21) Appl. No.: 18/286,234

(22) PCT Filed: Apr. 11, 2022

(86) PCT No.: PCT/US2022/024221
§ 371 (c)(1),
(2) Date: Oct. 10, 2023

(87) PCT Pub. No.: WO2022/221173
PCT Pub. Date: Oct. 20, 2022

(65) Prior Publication Data

US 2024/0260559 A1 Aug. 8, 2024

Related U.S. Application Data

(60) Provisional application No. 63/201,076, filed on Apr. 11, 2021.

(51) Int. Cl.
*A01M 1/10* (2006.01)
*A01M 1/02* (2006.01)
*A01M 13/00* (2006.01)

(52) U.S. Cl.
CPC ............ *A01M 1/023* (2013.01); *A01M 1/026* (2013.01); *A01M 1/106* (2013.01); *A01M 13/003* (2013.01)

(58) Field of Classification Search
CPC .......... A01M 1/00; A01M 1/02; A01M 1/023; A01M 1/026; A01M 1/10; A01M 1/106; A01M 1/12; A01M 13/00; A01M 13/003
(Continued)

(56) References Cited

U.S. PATENT DOCUMENTS 1,071,620 A * 8/1913 Kingsland ............ A01M 1/106 43/107
1,885,854 A * 11/1932 Montellano ............ A01M 1/08 43/139

(Continued)

FOREIGN PATENT DOCUMENTS

CN 106614455 A * 5/2017 .............. A01M 1/04
CN 110537534 A * 12/2019 ........... A01M 1/023

(Continued)

*Primary Examiner* — Darren W Ark
(74) *Attorney, Agent, or Firm* — Nitin Kaushik

(57) ABSTRACT

The present disclosure relates to an organism trapping device that includes a vibration wave generator configured to generate frequency ranges from 1.00 to 1.67 Hz (Hertz), an inciting engine communicatively coupled with the vibration wave generator, and configured to generate signals representing vibration parameters based on the generated frequency, a walled container operatively coupled with the inciting engine and adapted to contain fluid and receives the generated signals to simulate flow of blood in human blood vessels based on the vibration parameters to attract number of organisms towards the device, a fumigating agent adapted to compress the number of organisms entering into the device, sensors configured to sense an entry of number of organisms into the device, and a processor communicatively coupled with the sensor and activates the fumigating agent based on the signal received from the sensor. The present disclosure also relates to method of trapping organisms.

15 Claims, 9 Drawing Sheets

(58) Field of Classification Search
USPC ........................................ 43/107, 132.1, 125
See application file for complete search history.

(56) References Cited

U.S. PATENT DOCUMENTS 3,137,092 A * 6/1964 Salerno ................. A61M 21/00 446/295
3,885,341 A * 5/1975 Kuchenbecker ...... A01M 1/106 43/65
3,994,282 A * 11/1976 Moulet ................. A61M 21/00 434/266
4,044,494 A * 8/1977 Grajnert ................ A01M 1/106 43/119
4,411,094 A * 10/1983 Spackova ............ A01M 1/026 43/111
4,625,453 A * 12/1986 Smith ..................... A01M 1/06 43/139
4,856,226 A * 8/1989 Taylor ..................... A01M 1/08 43/111
5,123,201 A * 6/1992 Reiter ................... A01M 1/026 43/107
5,199,877 A * 4/1993 Page ...................... G09B 23/28 434/270
5,241,778 A * 9/1993 Price ..................... A01M 1/223 43/132.1
5,657,576 A * 8/1997 Nicosia ................. A01M 1/223 43/132.1
5,926,997 A * 7/1999 Wilcox ................. A01M 1/026 43/60
6,088,949 A * 7/2000 Nicosia ................. A01M 1/023 43/132.1
6,467,215 B1 * 10/2002 Nelson ................ A01M 1/2016 43/132.1
6,513,282 B2 * 2/2003 Schott ................. A01M 13/003 43/125
6,688,036 B1 * 2/2004 Gunn .................. A01M 13/003 43/138
7,908,791 B1 * 3/2011 Brash .................. A01M 13/003 43/125
9,387,501 B2 * 7/2016 Gale ................... A01M 7/0003
11,690,367 B2 * 7/2023 Luttels ................... A01K 31/12 43/132.1
12,302,888 B2 * 5/2025 Sandford .............. A01M 1/145
2002/0011020 A1 * 1/2002 Nelson ................ A01M 1/2038 43/107
2003/0160699 A1 * 8/2003 Trompen ............. A01M 1/2011 340/573.2
2004/0093190 A1 * 5/2004 Beroza .................... A01M 1/14 702/189
2007/0084105 A1 * 4/2007 Lindsay .............. A01M 1/2094 43/132.1
2008/0163541 A1 * 7/2008 Harris ....................... B65F 1/16 43/131
2008/0251514 A1 * 10/2008 Fitzpatrick ............. B65D 88/74 220/86.1
2009/0127207 A1 * 5/2009 Okamoto ................ B63B 13/00 210/151
2009/0211148 A1 * 8/2009 McCarty ............... A01M 19/00 29/401.1
2009/0272024 A1 * 11/2009 Rogacki .............. A01M 13/003 43/125
2010/0086453 A1 * 4/2010 Adams .................. A01M 13/00 422/292
2010/0186285 A1 * 7/2010 Schmitt ................... A01M 1/24 43/132.1
2014/0169138 A1 * 6/2014 Lee ......................... A01M 1/24 43/2
2014/0283437 A1 * 9/2014 Brannon ................. A01M 1/20 43/132.1
2015/0335004 A1 * 11/2015 Gale ................... A01M 1/2022 43/132.1
2017/0035039 A1 * 2/2017 Sandford .............. A01M 1/023
2017/0196213 A1 * 7/2017 Addis ................... A01M 1/026
2017/0303523 A1 * 10/2017 Sandford ................ F21S 8/035
2017/0354135 A1 * 12/2017 Ching ................... A01M 1/106
2018/0093288 A1 * 4/2018 Tillotson ............. A01M 1/2038
2020/0305406 A1 * 10/2020 Ritchie ................. A01M 1/145
2022/0155477 A1 * 5/2022 Lake ..................... A01M 1/026
2024/0090490 A1 * 3/2024 Du .......................... A01M 1/04
2025/0204511 A1 * 6/2025 Wright .................. A01M 13/00

FOREIGN PATENT DOCUMENTS

CN 212184794 U * 12/2020
CN 112262830 A * 1/2021
CN 212488112 U * 2/2021
CN 219762283 U * 9/2023
JP 3520963 B2 * 4/2004 .............. A01M 1/14
JP 3582665 B2 * 10/2004
WO WO-9944417 A2 * 9/1999 ............ A01M 1/223
WO WO-2018090936 A1 * 5/2019 .............. A01M 1/02
WO WO-2020084590 A1 * 4/2020 ............ A01M 1/023
WO WO-2021196072 A1 * 10/2021
WO WO-2021198869 A1 * 10/2021

* cited by examiner

300

400

DEVICE AND PROCESS FOR TRAPPING AND COMPRESSING ORGANISMS

TECHNICAL FIELD

The present disclosure relates to compressing organisms. More particularly, the present disclosure relates to a device and a method for trapping and compressing organisms.

BACKGROUND

According to the American Mosquito Control Association, "Blood sucking organisms such as mosquito cause more suffering to mankind than other organism. Over one million people worldwide die from mosquito-borne diseases every year. Not only can mosquitoes carry diseases that afflict humans, but also transmit several diseases and parasites that dogs and horses are susceptible to. In addition, mosquito bites can also cause severe skin irritation through an allergic reaction to the mosquito's saliva—this is what causes the red bump and itching.

Generally, the commercially available mosquito traps attract the mosquitoes closer to the wavelength of the external light. In the path, the mosquito body is killed by the short circuit of the high voltage power grid. Although it has certain effects, it still has the following disadvantages:—due to the use of ultraviolet light for the long waveform about the nanometer, when the distance of the mosquito trap from the human body is 5 feet, the device may cause eye/retinal injury, and the skin injury may lead to skin cancer after long-term exposure.

Furthermore, the high-voltage power grid for mosquito trapping is easy to cause significant harm like electric shock, to the limbs, especially to the children. "In the early days, the above-mentioned ultraviolet light was used as an inducer. After entering, the mosquito was trapped in the inside of a net body by means of fan pressurization. After the fan stopped working, the mosquito may escape in the opposite direction. Recently, photocatalysts use their specific light waves to make carbonization in the attracting substances. In the process, they must be operated by voltage strikes and fan turbulence. The repair uses the light source to attract mosquitoes nearby and is formed by grid strike and fan current collection.

Resistance to chemical methods and non-biological methods of vector elimination has failed to solve the menace of mosquitoes. Present biological methods are deficient/not very effective or costly and has environmental consequences. Multiple devices have been developed to trap bloodsucking vectors like mosquitoes. The mosquitoes develop ability to resist the traps before the device get commercialized and leads to failure and discarding the technology. The advantages of understanding the mechanism of host detection by the blood sucking mosquitoes is multifold. Those mosquitoes which have weak mechanisms will perish due to natural causes. Those with strong mechanisms for host detection will be caught in the trap. This provides a dual mechanism for prevention of resistance while being effective for mosquito elimination.

Various methods were tried to attract the mosquitoes and more yet to be studied. Although, plenty of methods need to be exercised and require a precise mechanism to attract these annoying blood suckers. Even though it should be kept in mind that the development of the male and female mosquitoes trap or say attractants needs to be devised. The methods described in the prior arts failed to give a desirable outcome, none of them were hundred percent efficient and majority of them developed resistance leading to failure of the technology. Mosquitoes are attracted to the $CO_2$ therefore, the more $CO_2$ humans release, the easier humans become the targets.

In a prior art, US'0075A which discloses a collapsible mosquito trap for collecting samples of mosquitoes for the study of population density, and the study of diseases present in the mosquitoes. The collapsible mosquito trap comprises a disc, a light source and holder attached to the disc, a collapsible waterproof chamber having top and bottom openings, a pervious netting cylinder and a rigid impervious container. The mosquito trap is adapted to capture mosquitoes and let the larger beetles and flying insect's escape.

In one of the closest art, US'9296B1 which discloses an insect trap that utilizes a combustion chamber to produce carbon dioxide for an attractant. Combustion gases from the combustion chamber are cooled in a conduit for the trap inlet. Thus, a single fan may be used for both drawing insects into the insect trap and for cooling the combustion chamber. The invention further discloses an insect trap comprising a conduit for the entry of insects and including a trap entry; a fan for drawing air through the conduit; a combustion chamber having an outlet in fluid communication with an attractant outlet. Unlike female mosquitoes, the males are not lured by $CO_2$ or body odour, hence a better approach is required. Different mosquitoes respond differently to various body odour, a particular odour will stop working as the mosquitoes will get resistant or the group will change with time and the traps will stop working. Natural selection will allow the population which is resistant to the odour will continue to grow in numbers and eventually replace the population. Thus, leading to the failure of these traps. For continued success they require repeated change in the odour.

LED based mosquito trap lamp combined with liquid mosquito bait are commercially available in the market. The mosquito lamp employs visible light LED with filters filtrated visible light LED for emitting UV lights. The mosquito trap lamp, which uses the piezoelectric vibrator for assisting the emanation of the mosquito bait(s) and for enhancing the efficiency of mosquito attraction. The mosquito trap lamp apparatus, including at least a casing, a lid, a LED light set, a bait-drawing means, a bait-releasing unit, a power supply and a mosquito destroying device. However, this method is not preferable as it can't give an enhancing result as it employs an expensive methodology. In addition, the vibrations are not reflective of blood flowing through the capillaries and arteries and thus make it inferior to the current invention.

In another prior art, which is pertaining to an insect trap, more particularly for collecting arthropods, for example ticks. The device comprises a container, an attractant, a base, and adhesive tape or strip attached to the top of the base. Arthropods are directed towards the tape by an attractant whereby the insects are stuck to the adhesive surface on their dorsal side. The adhesive surface may be oriented to maximally trap insects, such as facing the adhesive towards the walls of the attractant container rather than towards the ground. The said attractant is a source of $CO_2$. Even with the presence of mosquito traps, mosquitoes preferentially go to human target, as multiple aspects of mosquito's physiology are unknown at this time.

The aforementioned prior arts discuss different devices and techniques for trapping or catching the mosquitoes. These techniques mostly stress on the mosquito traps and attractants. In the methods and techniques for trapping mosquitoes and blocking their survival known in the above prior arts, it is disadvantageous that even with the presence of mosquito traps, mosquitoes preferentially go to human targets. The above devices don't aid in controlling the continuously growing population of lethal mosquitoes that may spread diseases.

SUMMARY

In one aspect of the disclosure, an organism trapping device for trapping organisms is provided.

The device includes a vibration wave generator, that is configured to generate frequency ranging from 1.00 to 1.67 Hz (Hertz), an inciting engine, that is communicatively coupled with the vibration wave generator, and configured to generate signals representing vibration parameters based on the generated frequency, a walled container that is operatively coupled with the inciting engine and adapted to contain fluid and receives the generated signals to simulate flow of blood in human blood vessels based on the vibration parameters to attract number of organisms towards the device, a fumigating agent that is adapted to compress the number of organisms entering into the device, sensors that are configured to sense an entry of number of organisms into the device, and a processor that is communicatively coupled with the sensors and activates the fumigating agent based on the signal received from the sensors.

In some aspect the processor is communicatively coupled to the vibration wave generator and configured to generate the frequency mimicking a human heart.

In some aspect, device is adjustable in dimension.

In some aspect, the walled container is flexible container.

In some aspect, the vibration wave generator further comprises a transducer and a mechanical driver.

In some aspect, the vibration parameters are selected from a group comprising fluid pressure, volume and time intervals.

In some aspect, the walled container is further operatively coupled with number of tubes.

In some aspect, the processor is further communicatively coupled with a sludge extruder, wherein the sludge extruder is configured to expel a compressed number of organisms.

In some aspect, the vibration wave generator generates a range of frequency similar to human heart rate.

In some aspect, the sensors are a proximity sensor or motion sensor.

In some aspect, the fluid is one of gel, semi-flow liquid, water, alcohol, oil, fruit extract, fragrance or organic compounds.

In some aspect, the fluid contains disc like colloidal material to simulate flow in tubes to generate capillary blood flow pattern.

In some aspect, the device further includes a fog fumigator that is configured to create fog in a vent stack.

In some aspect, the device further comprising a foam creator and a plunger and are configured to push foam created by the foam fumigator to the vent stack by way of the plunger.

In some aspect, the device further comprising a solar cell to power the device.

In second aspect of the disclosure, an organism trapping device for trapping organisms and compressing a trapped organisms by heating is provided.

The device includes a vibration wave generator that is configured to generate frequency ranging from 1.00 to 1.67 Hz (Hertz), an inciting engine, that is communicatively coupled with the vibration wave generator, and configured to generate signals representing vibration parameters based on the generated frequency, a walled container that is operatively coupled with the inciting engine and adapted to contain fluid and receives the generated signals to simulate flow of blood in human blood vessels based on the vibration parameters to attract number of organisms towards the device, a fumigating agent that is adapted to compress the number of organisms entering into the device, the sensors are configured to sense an entry of number of organisms into the device, and a processor that is communicatively coupled with the sensors and activates the heating element based on the signal received from the sensors.

In some aspect, the heating element is a solar lamp.

In third aspect of the disclosure, a method of trapping number of organisms.

The method involves generating frequency ranging from 1.00 to 1.67 Hz by a vibration wave generator, imparting a generated range of frequency to a walled container containing fluid by an inciting engine, attracting number of organisms by means of stimulated flow of the fluid created due to vibration generated by the inciting engine, trapping number of organisms entering device by means of an inlet, sensing an entry of the number of organisms by sensors, communicating a sensor signal sensed by the sensors to a processor, and activating a fumigating agent to compress the number of organisms entering the device.

In fourth aspect of the disclosure, an inlet for trapping organisms is provided.

The inlet apparatus includes number of hair like projections are mounted on wall of the inlet.

In some aspect, the number of hair like projections are mounted on top wall of the inlet, bottom wall of the inlet, left wall of the inlet, right wall of the inlet and a combination thereof.

BRIEF DESCRIPTION OF DRAWINGS

The drawing/s mentioned herein disclose exemplary embodiments of the claimed invention. Other objects, features, and advantages of the present invention will be apparent from the following description when read with reference to the accompanying drawing:

To facilitate understanding, like reference numerals have been used, where possible to designate like elements common to the figures.

DETAILED DESCRIPTION OF PREFERRED EMBODIMENTS

This section is intended to provide explanation and description of various possible embodiments of the present invention. The embodiments used herein, and the various features and advantageous details thereof are explained more fully with reference to non-limiting embodiments illustrated in the accompanying drawing/s and detailed in the following description. The examples used herein are intended only to facilitate understanding of ways in which the embodiments may be practiced and to enable the person skilled in the art to practice the embodiments used herein. Also, the examples/embodiments described herein should not be construed as limiting the scope of the embodiments herein.

As mentioned, there is a significant need to develop a highly efficient mosquito trapping device and methodology which not only prevent their resting into the plumbing systems but also reduce their overwhelming population. The present disclosure provides an organism trapping device that mimics the frequency of heartbeat and traps the mosquito.

Figure 1:
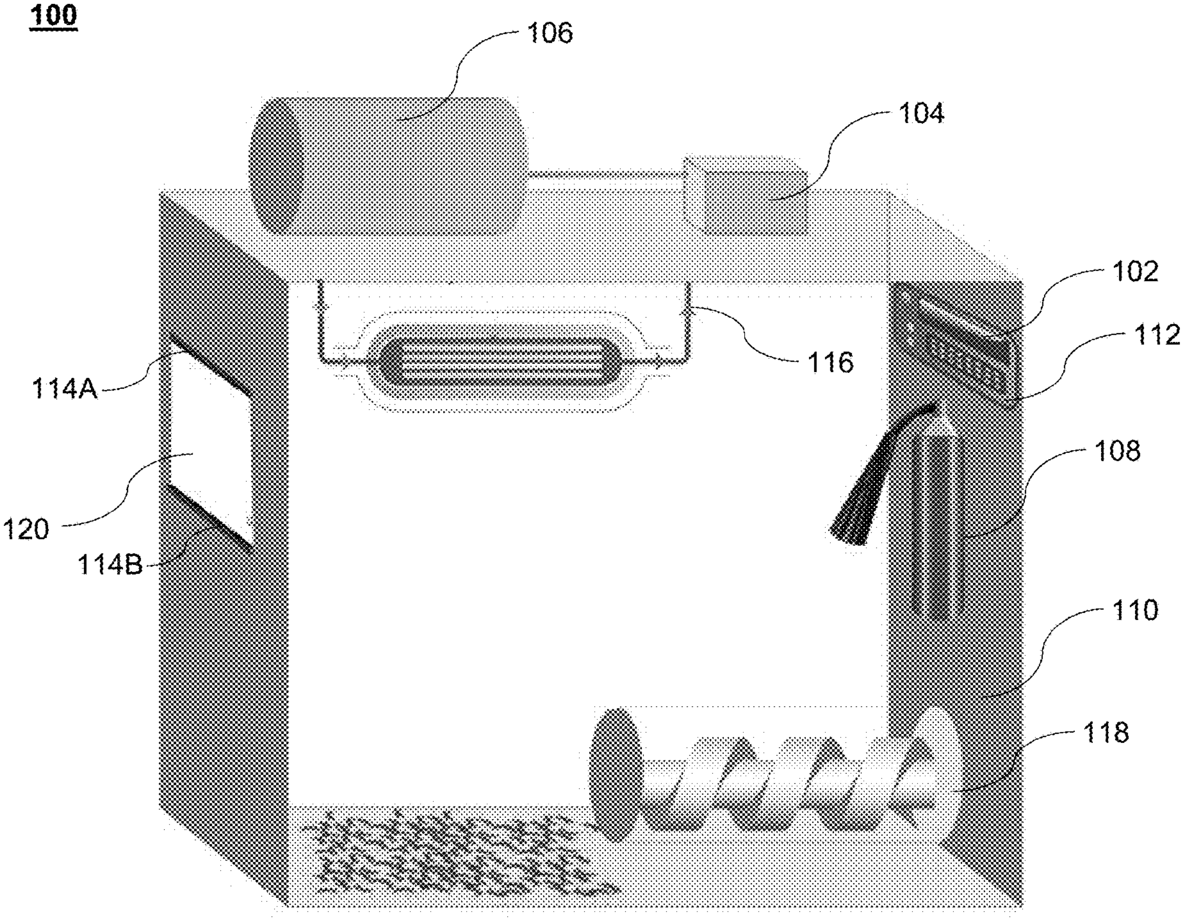
FIG. 1 illustrates an organism trapping device for trapping number of organisms, according to an embodiment herein.

FIG. 1 illustrates an organism trapping device 100 for trapping number of organisms, according to an embodiment herein.

The organism trapping device 100 may include a vibration wave generator 102, an inciting engine 104, a walled container 106, a fumigating agent 108, a device body 110, a processor 112, a sensors 114 (114A and 114B) (herein referred to as sensor for a single component), number of tubes 116 (herein referred to as capillary tube for a single component), a sludge extruder 118, and an inlet 120.

The vibration wave generator 102 may be configured to generate a range of frequency. In some aspects, the range of frequency may be 1.00 to 1.67 Hz (Hertz). In some aspect, the vibration wave generator 102 may generate the waves mimicking pulse wave generated by a human heart beat. In some aspect, the vibration wave generator 102 will generate the vibratory waves simulating the blood flow of the heart. It may incorporate a pulsatile pumping mechanism along with small capillary tubes in which a particulate fluid is flowing simulating the blood flowing in the capillaries of a warm-blooded organism. In some aspect, the vibration wave generator 102 generates a range of frequency similar to human heart rate.

The inciting engine 104 may be communicatively coupled with the vibration wave generator 102 and configured to generate signals representing vibration parameters based on the generated frequency. In some aspect, the vibration parameters include, but not limited to, fluid pressure, fluid volume, time intervals, and the like.

The walled container 106 may be operatively coupled with the inciting engine 104 and adapted to contain fluid and receives the generated signals to simulate flow of blood in human blood vessels based on the vibration parameters to attract one or more organisms towards the device 100. In some aspects, the fluid may include, but not limited to, water, alcohol, oil, blood, fruit juice, fragrance, and the like. In some aspect, the fluid may contain colloids. In some aspect, size of the colloidal material may range from 7-8 μm. In some other aspect, the colloids may be disc like structure. In some other aspect, the disc like colloidal material simulates flow in tubes to generate capillary blood flow pattern.

The fumigating agent 108 may be adapted to compress the number of organisms entering into the device 100. In some aspects, the fumigating agent 108 may be stored in a sprayer. In some other aspects, the fumigating agent 108 is one of hydrogen cyanide, naphthalene, nicotine, methyl bromide, 1,3-dichloropropene, dazomet (methyl isothiocyanate precursor), chloropicrin, formaldehyde, hydrogen cyanide, iodoform, methyl isocyanate, phosphine, sulfuryl fluoride, or sulfur dioxide. In another aspect, the fumigating agent 108 may be a biological agent with anti pest properties like neem oil.

In some aspect, the device body 110 may contain a sticky glue, that may be configured to trap the organism entering the device.

The sensors 114, may be communicatively coupled to the processor 112. The sensors 114 may sense the signals representing the number of organisms entering the device 100. In some aspect, the sensors 114 may be attached on the inlet 120. In some aspect, the number of organisms may be blood sucking organisms. In some other aspect, the blood sucking organisms include, but not limited to, Mosquito, Black flies, horse flies, deer flies, lice, bed bugs, fleas, mites, ticks and the like. In some other aspect, the blood sucking organisms may spread diseases such as Malaria, dengue, filaria, Kala-azar, Japanese encephalitis, Chikungunya, and the like. In some aspect, the sensors 114 may include, but not limited to, motion sensor, proximity sensors, infrared sensor, and the like. The processor 112, may be communicatively coupled with the sensors 114 such that the processor 112 activates the fumigating agent 108 when the sensors 114 senses signal representing the entry of number of organisms. In some aspect, the processor 112 may be configured to generate the frequency mimicking a human heart by way of the vibration wave generator 102.

The transmitter and receiver (not shown) that can communicate with a wireless network element via transmitting and receiving radio waves (cellular, RFID, etc.) via antenna (not shown). The transmitter and antenna are configured to modulate a data signal, up-convert modulated data signal to an RF frequency and transmit a signal containing data information received from the sensors 114 as a radio wave over a wireless network to the processor 112.

The processor 112 and the receiver antenna (not shown) are also configured to receive a radio wave containing modulated signal information transmitted from the sensors 114 by way of transmitter (not shown) over a wireless network, down-convert the received radio wave and demodulate the down-converted modulated signal and provide output as reproduced data transmitted from the transmitter (not shown).

In some aspect, the wireless network element can include, for example, an access point (e.g., a Wi-Fi access point), a femtocell, a cellular phone or personal communication or data device, a desktop computer, an RFID device, a portable computing device such as a laptop, a tablet, etc., and may allow wireless communication devices to connect to a wireless network using Wi-Fi, Bluetooth, an element such as a base station using a cellular communication technology such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or another wireless technology and/or standard. A wireless network can utilize number of technologies, for example, technologies such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA).

In operations, the vibration wave generator 102 may generate a frequency similar to human heart and communicates the generated frequency to the inciting engine 104. The inciting engine 104 may simulate movement of flow of fluid in the walled container 106 to attract the number of organisms towards the device 100. The sensors 114 may sense signal representing an entry of number of organisms into the device and communicates the sensed signal to the processor 112. The processor 112 may actuate the fumigating agent 108 to suffocate/compress the number of organisms entering the device 100.

In some aspect, the device 100 may further include a solar cell to power the device 100.

In some aspect, after the organism enters into the device, a foam is released to seal the exit.

In some aspect, the organism trapping device 100 may be an electromechanical apparatus.

In some aspect, the sensors 114 may be a proximity sensor or a motion sensor.

In some aspect, the vibration wave generator 102 may generate a range of frequency. In an embodiment, the wave generator 102 may generate a frequency related to number of frequency of human blood flow. In some embodiments, the range of frequency may be 1.00 to 1.67 Hz (Hertz).

Figure 2:
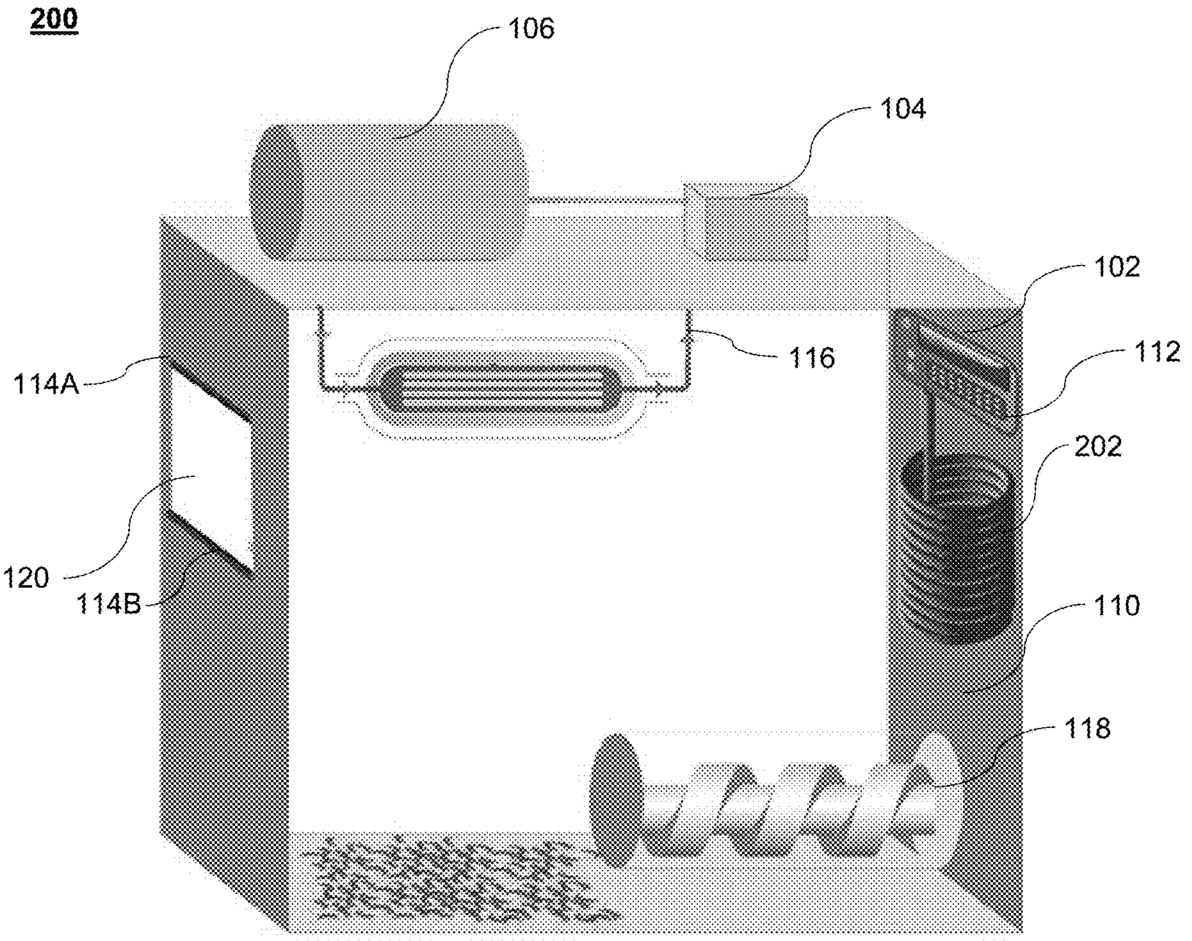
FIG. 2 illustrates an organism trapping device for trapping number of organisms by a heating element, according to an embodiment herein.

In an aspect the fumigating agent 108 may be replaced with a heating element 202 as shown in FIG. 2. In an aspect the fumigating agent 108 may be replaced with a foam.

In an aspect, the processor 112 may communicate with the sludge extruder 118 periodically and removes the settled sludges. In some other aspect, the sludge extruder 118 may be configured to expel a compressed number of organisms.

In another aspect, the walled container 106 may be operatively coupled with number of tubes 116 to mimic the flow of blood in the heart capillaries. In some aspect, size of the capillary tube may be 8 to 10 microns in diameter. In some other aspects, the capillary tube may include number of blockages, that block the colloid particles liquid flow and resembles as blood cells blockages in blood vessels. In some aspect, the tubes 116 may be replaced with dialysis filter tube. In some other aspect, the walled container 106 may be flexible in nature.

In some aspect, the device 100 may be powered by a solar power source. In some other aspect, the device 100 may be adjustable in dimension.

FIG. 2 illustrates an organism trapping device 200 for trapping number of organisms by a heating element 202, according to an embodiment herein.

The organism trapping device 200 for trapping organism may include a heating element 202. In an embodiment, the heating element 202 may be a high voltage coil to kill the number of trapped insects. In another embodiment the heating element 202 may be a solar lamp. In some aspect, the trapped organism may be Incinerated using the electrical coil, generating carbon dioxide and both attracting other insects.

Figure 3:
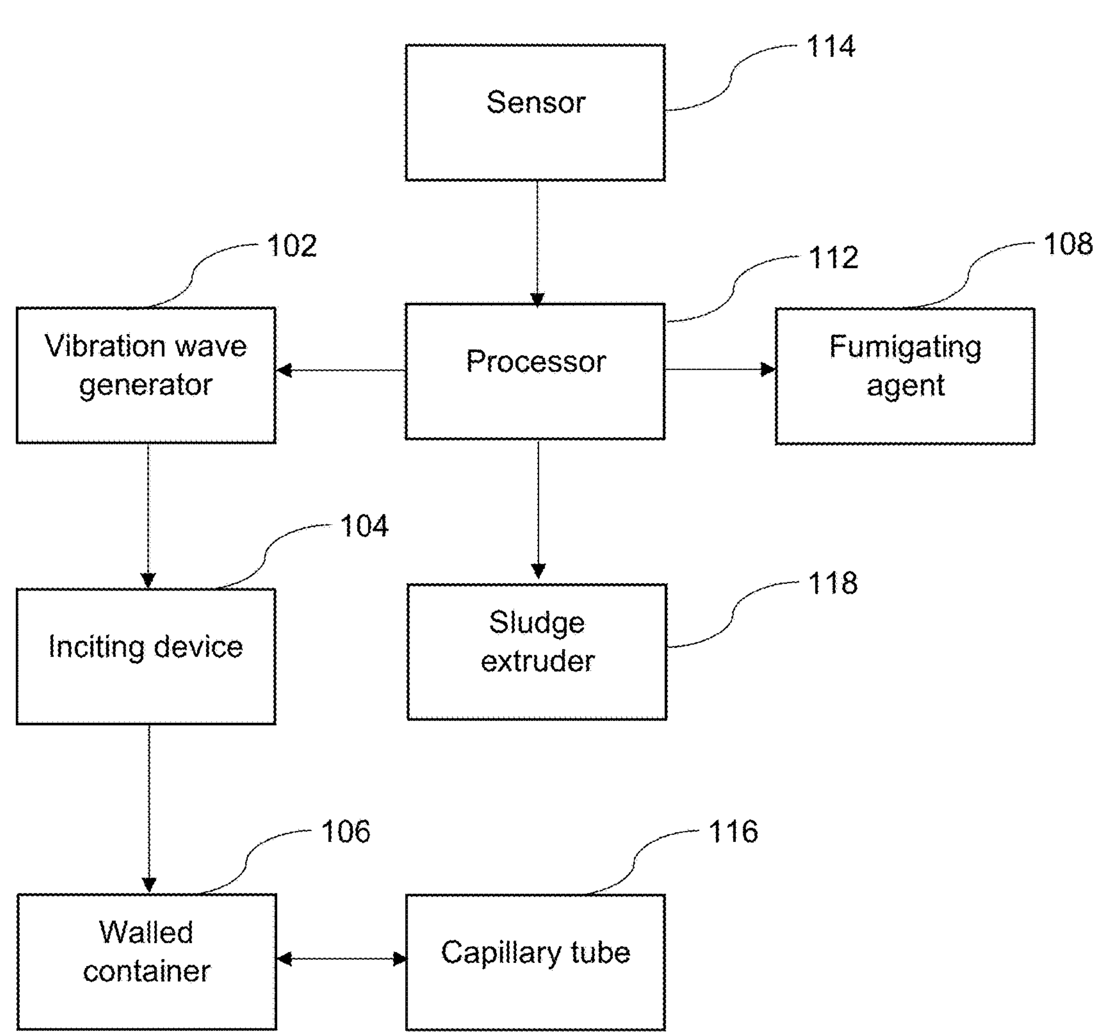
FIG. 3 illustrates a block diagram of the organism trapping device of FIG. 1, according to an embodiment herein.

FIG. 3 illustrates an exemplary block diagram of the organism trapping device 100 of FIG. 1, according to an embodiment herein.

The processor 112 may be communicatively coupled to the sensors 114, the vibration wave generator 102, the fumigating agent 108 and the sludge extruder 118 as shown in the FIG. 3.

The vibration wave generator 102 may be operatively coupled with the inciting engine 104 and the inciting engine 104 may be operatively coupled with the walled container.

The walled container 106 may be operatively coupled with the number of tubes 116. The walled container 106 may be attached to a pump (not shown) circulates the fluid in across the number of tubes 116.

In some aspects, the device 100 may attracts mosquito by principle of pulsatile flow of blood. In some other aspects, the device 100 may mimics natural cycle of heart. In some other aspects, the blood flowing through arteries and capillaries may be stimulated to produce subtle vibrations which are similar to natural blood flow of animals.

In some aspects, the device 100 may be implemented in a drainage vent system.

In some other aspects, the foam covers the surface of the walled container, thus removing the resting space for the mosquitoes.

In some other aspects, the device 100 is adjustable in dimension. In some other aspects, the walled container of apparatus is flexible and adjustable.

In some aspects, the vibration wave generator may include a transducer and a mechanical driver.

In some aspects, the range of frequencies may be based on a plurality of different components of the cardiovascular system, including but not limited to the heart, the major blood vessels, the arteries, the capillary and the veins.

In some aspects, the device 100 may be provided with a solar-panel combined with solar-mosquito lamp, a solar-trash can, foam, a fumigating agent, a sealed-drain cover.

In some aspects, the foam is a chemical or natural substance. In some other aspects, the foam seals routes of mosquito entrance and exit in plumbing and drainage system.

Figure 4:
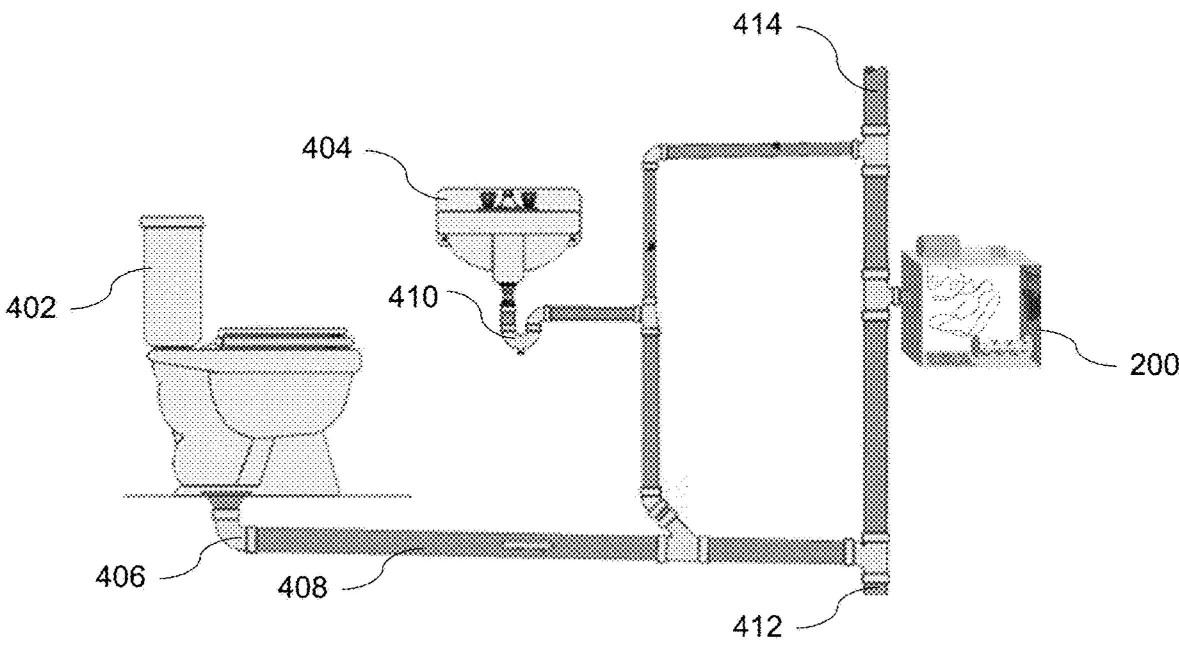
FIG. 4 illustrates a vent system, according to an embodiment herein.

FIG. 4 illustrates an exemplary vent system 400, according to an embodiment herein.

The vent system may include a first fixture 402, a second fixture 404, an elbow 406, a drain pipe 408, a water trap 410, a solid stack 412 and a stack vent 414.

The first fixture 402 may be coupled to the drain pipe 408 by way of the elbow 406. In some aspect, the first fixture 402 may be connected to the drain pipe 408 by way of the water trap 412.

The second fixture 404 may be coupled to the drain pipe 408 by way of the water trap 410. In some aspect, the second fixture 404 may be connected to the drain pipe 408 by way of the elbow 406.

The drain pipe 408 may be coupled to the solid stack 412 by way of the stack vent 414.

The stack vent 414 may be coupled to the organism trapping device 100.

In some aspect, the organism trapping device 100 may be replaced with the organism trapping device 200.

In an exemplary scenario, insects and other blood sucking organisms born on the solid stack 412 may migrate towards the stack vent 414. While migrating, the insect attracts frequency 1.00 to 1.67 Hz (Hertz) generated by the vibration wave generator 102. The proximity sensors in the device 100 or 200 activates fumigation or heating coil to compress the organisms entering the device 100 or 200 by way of the processor 112.

In some aspect, the organism trapping device 100 may further include a fog fumigator (not shown). In some aspect, the fog fumigator (not shown) may be configured to create fog in the vent stack 414. In some aspect, the organism trapping device 100 may further include plunger (not shown) and a foam creator (not shown). In some aspect, the organism trapping device 100 may be configured to push foam created by the foam fumigator to the stack vent 414 by way of a plunger. In some aspect, the fog generated by the fog fumigator, may be used to temporarily block an exit of the stack vent 414.

Figure 5A:
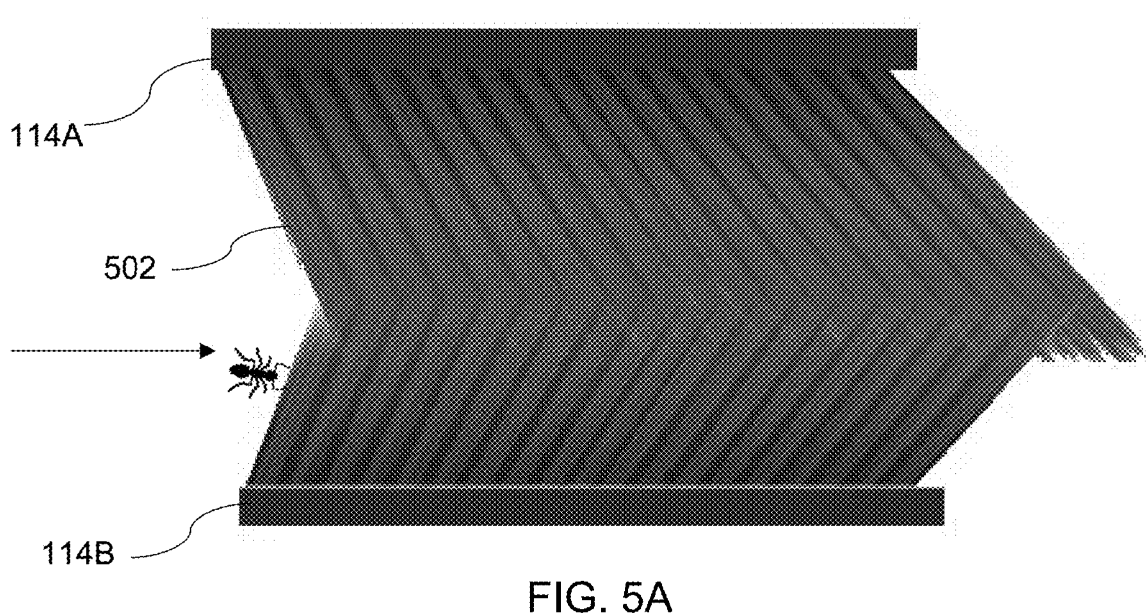
FIGS. 5A and 5B illustrates an exemplary one-way inlet, according to an embodiment herein.
Figure 5B:
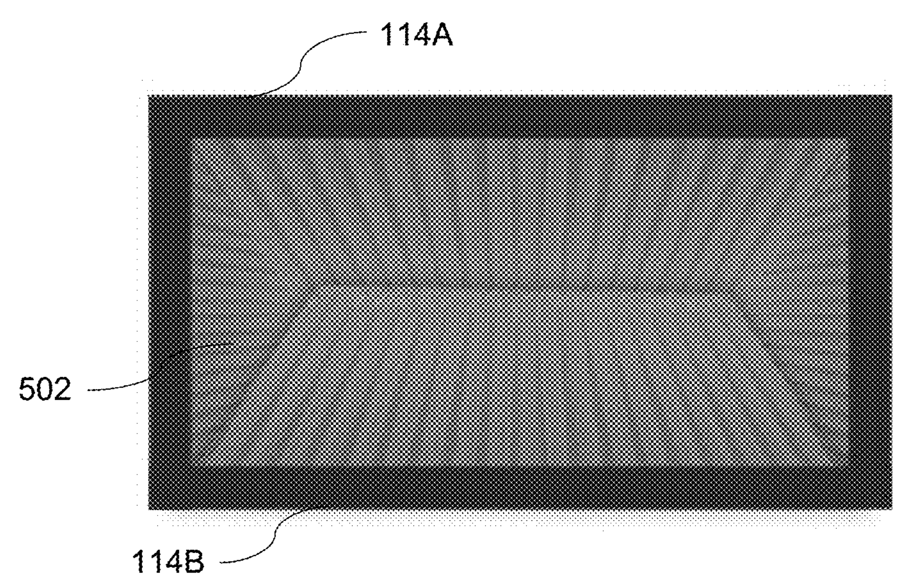

FIGS. 5A and 5B illustrates an exemplary one-way inlet, according to an embodiment herein.

In an exemplary aspect, the inlet 120 may include sensors 114 and number of hair like projections 502 as shown in the FIG. 5. In some aspect, the hair like projection 502 may be configured to act as one way entry to the device 100. In some other aspect, the hair like projections 502 are projected from top of the inlet 120. In some other aspect, the hair like projections 502 are projected from bottom of the inlet 120. In some other aspect, the hair like projections 502 are projected from right wall of the inlet 120. In some other aspect, the hair like projections 502 are projected from left wall of the inlet 120. In some other aspect, the hair like projections 502 allows the number of organisms to enter the device from one end and traps the number of organisms inside the device. In some other aspect, the number of organisms may include, insects, rodents, reptiles, and the like.

In some aspects, size of the hair may range from 1 micron to 2 millimeter in diameter.

Figure 6:
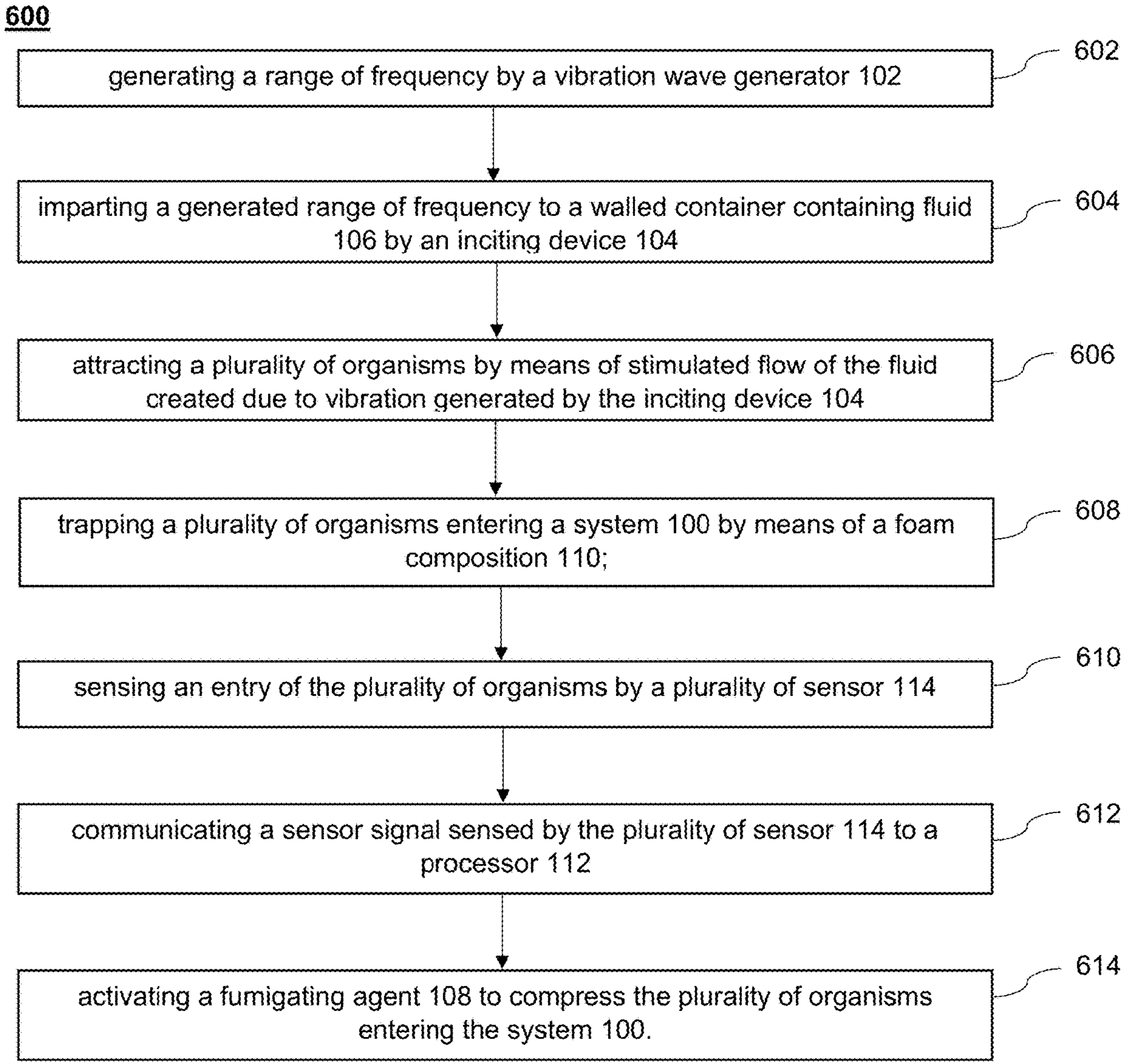
FIG. 6 illustrates a method of trapping an organism, according to an embodiment herein:—

FIG. 6 illustrates a method of trapping an organism, according to an embodiment herein.

At step 602, the device 100 may be configured to generate range of frequency by way of the vibration wave generator 106.

At step 604, the device 100 may be configured to impart the generated range of frequency to the walled container 106 containing fluid by way of the inciting engine 104.

At step 606, the device 100 may be configured to attract the number of organisms by means of stimulated flow of the fluid created due to vibration generated by way of the inciting engine 104.

At step 608, the device 100 may be configured to trap the number of organisms entering a device 100 by means of an inlet 120. In some aspect, the inlet 120 may be a one-way trap.

At step 610, the device 100 may be configured to sense the entry of the number of organisms by way of the sensors 114.

At step 612, the device 100 may be configured to communicate the sensor signal sensed by the sensors 114 to a processor 112.

At step 614, the device 100 may be configured to activate the fumigating agent 108 to suffocate/compress the number of organisms entering the device 100.

Figure 7:
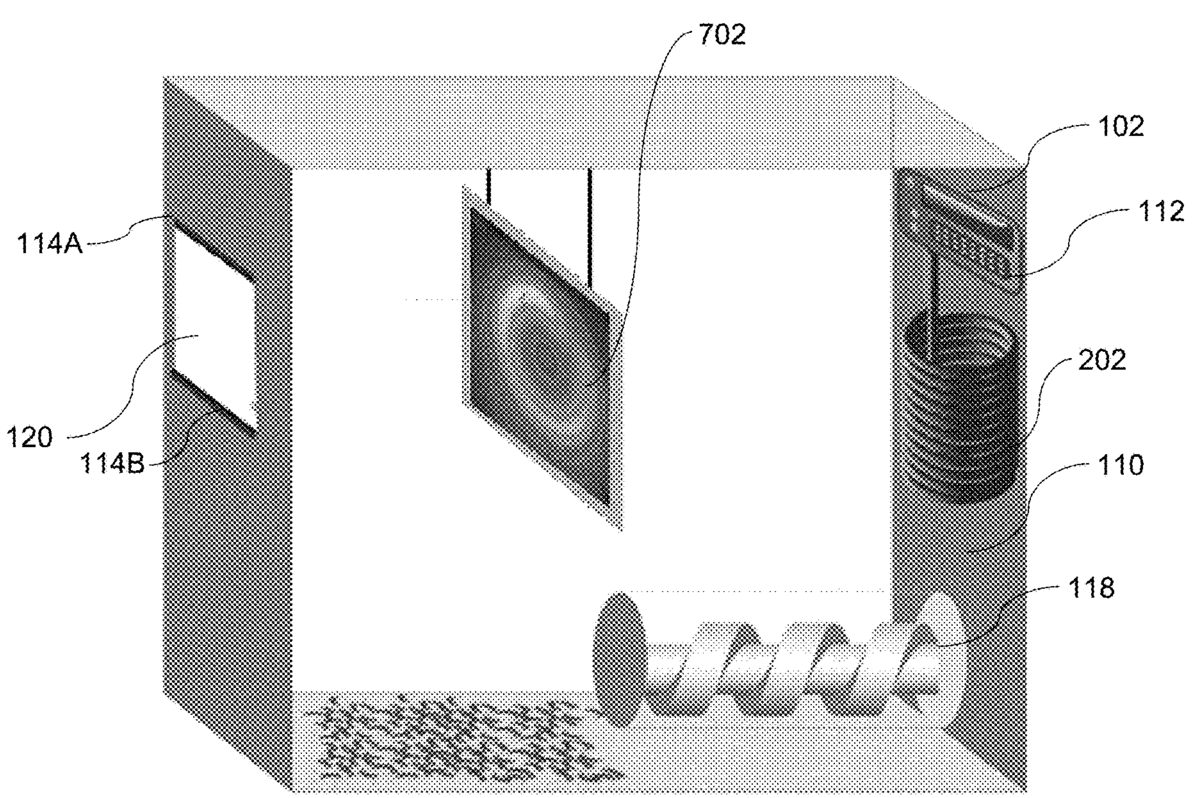
FIG. 7 illustrates an organism trapping device for trapping number of organisms by way of a thermal fluctuation pad, according to an aspect herein.

FIG. 7 illustrates an organism trapping device 700 for trapping the number of organisms by way of a thermal fluctuation pad 702, according to an aspect herein. The organism trapping device 700 is substantially similar to that of the organism trapping device 100 of FIG. 1 or the organism trapping device 200 of FIG. 2 with like elements referred by way of like reference numerals. However, the thermal fluctuation pad 702 of the organism trapping device 700 has a different way of trapping the number of organism when compared to the organism trapping device 100 of FIG. 1 or the organism trapping device 200 of FIG. 2. Specifically, the thermal fluctuation pad 702 is adapted to generate a thermal radiations that attracts the number of microorganisms.

The thermal fluctuation pad 702 may be communicatively coupled with the processor 112. The thermal fluctuation pad 702 may be adapted to generate thermal radiations mimicking thermal radiation of a human organ or skin such that, the thermal fluctuation pad 702 attracts the number of organisms entering the organism trapping device 700.

In some aspects of the present disclosure, the thermal fluctuation pad 702 may be similar to texture of a human skin, color of the human skin, odor of the human skin, or surface of the human skin.

In operation, the thermal fluctuation pad 202 may be adapted to mimic thermal radiation of a human organs and attracts the number of organisms. The sensors 114A and 114B disposed in the inlet 120 of the device 700 may be configured to sense the signal representing entry of the number of organisms. The processor 112 may be configured to receive the sensed signals from the sensors 114A and 114B. The processor 112 may be configured to trigger the heating element 202 or the fumigating agents 108 and compress the number of organisms entering the organism trapping device 700.

Figure 8:
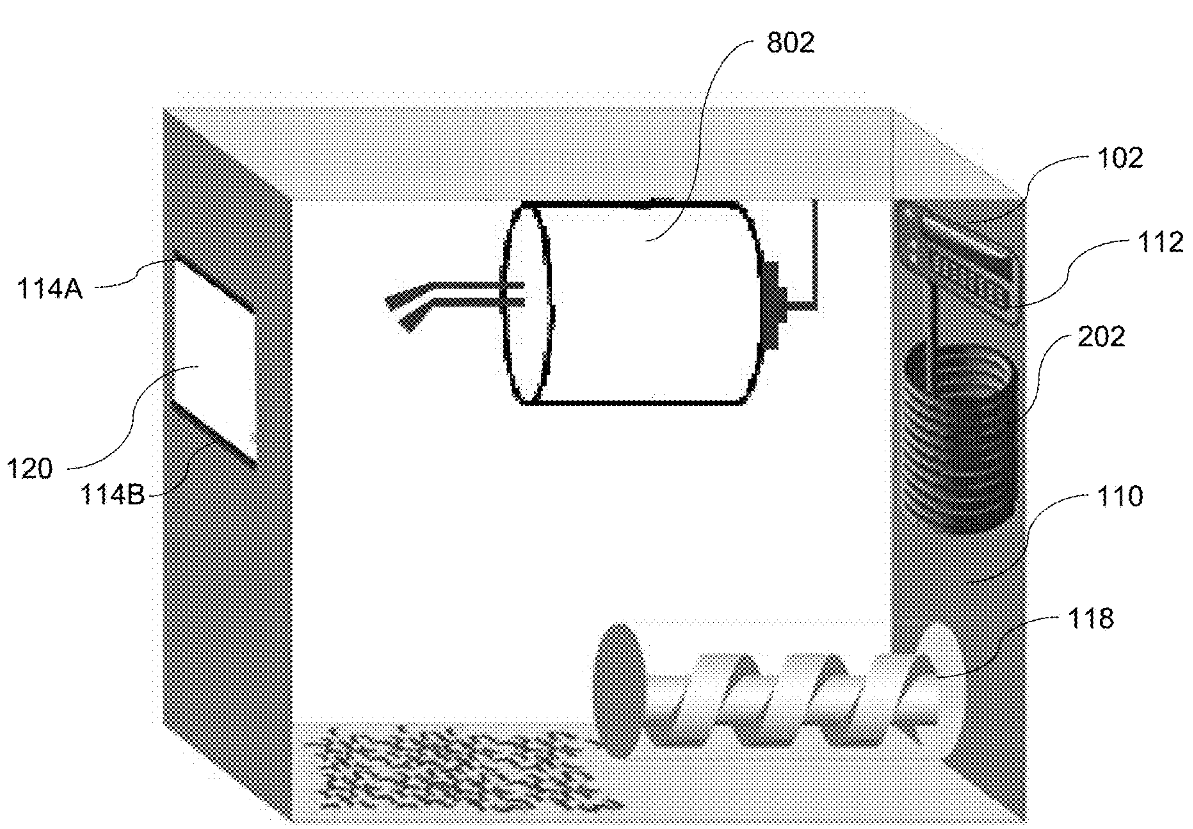
FIG. 8 illustrates an organism trapping device for trapping number of organisms by way of a breathing simulator pump, according to an aspect herein.

FIG. 8 illustrates an organism trapping device 800 for trapping number of organisms by way of a breathing simulator pump 802, according to an aspect herein. The organism trapping device 800 is substantially similar to that of the organism trapping device 100 of FIG. 1 or the organism trapping device 200 of FIG. 2 with like elements referred by way of like reference numerals. However, the breathing simulator pump 802 of the organism trapping device 800 has a different way of trapping the number of organism when compared to the organism trapping device 100 of FIG. 1 or organism trapping device 200 of FIG. 2. Specifically, the breathing simulator pump 802 generates an air motion similar to the inhale and exhale mechanism of human lungs that attracts the number of organisms.

The breathing simulator pump 802 may be communicatively coupled with the processor 112. The breathing simulator pump 802 may be couple with an oxygen tank (not shown) and a carbon-di-oxide tank (not shown).

The breathing simulator pump 802 may be adapted to mimic inhale and exhale mechanism of a human lungs such that the breathing simulator pump 802 attracts the number of organisms entering the organism trapping device 800.

In operation, the breathing simulator pump 802 may be adapted to mimic inhale and exhale mechanism of the human respiratory system and attracts the number of organisms. The sensors 114A and 114B in the inlet 120 of the device 100 may be configured to sense the signal representing entry of the number of organisms. The processor 112 may be configured to receive the sensed signals from the sensors 114A and 114B. The processor 112 may be configured to trigger the heating element 202 or the fumigating agents 108 and compress the number of organisms entering the organism trapping device 800. In some aspects of the present disclosure, the mosquito trapping device 802 may include a speaker (not shown) that may be configured to generate a snoring sound.

In operation, the snoring sound generated by the speaker in the mosquito trapping device 802 attracts the number of organisms. The sensors 114A and 114B in the inlet 120 of the device 100 may be configured to sense the signal representing entry of the number of organisms. The processor 112 may be configured to receive the sensed signals from the sensors 114A and 114B. The processor 112 may be configured to trigger the heating element 202 or the fumigating agents 108 and compress the number of organisms entering the organism trapping device 800.

In some aspects of the present disclosure, the snoring sound may be generated by disposing noise generators in breathing simulator device outputs and input valves (not shown).

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. An organism trapping device for trapping organisms, the device comprises:

a. a vibration wave generator, that is configured to generate vibration waves having a frequency ranging from 1.00 to 1.67 Hz;

b. an inciting engine, that is communicatively coupled with the vibration wave generator, and configured to generate signals representing one or more vibration parameters based on the frequency of the generated vibration waves;

c. a walled container that is operatively coupled with the inciting engine and adapted to contain fluid and receives the generated signals to simulate flow of blood in human blood vessels based on the one or more vibration parameters to attract one or more organisms towards the device;

d. a fumigating agent that is adapted to compress the one or more organisms entering into the device;

e. sensors, that are configured to sense an entry of the one or more organisms into the device and in response, generate a sensor signal;

f. a processor that is communicatively coupled with the sensors and activates the fumigating agent based on the sensor signal received from the sensors;

g. a sludge extruder configured to expel compressed organisms, wherein the processor is further communicatively coupled with the sludge extruder and configured to periodically activate the sludge extruder to expel the compressed organisms; and h. a device body, wherein the vibration wave generator, inciting engine, walled container, fumigating agent, sensors, and processor are operatively connected to the device body.

2. The device of claim 1, wherein the processor is communicatively coupled to the vibration wave generator and configured to control the vibration wave generator to generate a vibration wave of the vibration waves having a frequency mimicking a human heart.

3. The device of claim 1, wherein the device is adjustable in dimension.

4. The device of claim 1, wherein the walled container is flexible.

5. The device of claim 1, wherein the vibration wave generator further comprises a transducer and a mechanical driver.

6. The device of claim 1, wherein the one or more vibration parameters are selected from a group comprising fluid pressure, volume and time intervals.

7. The device of claim 1, wherein the walled container is further operatively coupled with one or more tubes.

8. The device of claim 1, wherein the vibration wave generator generates a range of frequency similar to human heart rate.

9. The device of claim 1, wherein the sensors are proximity sensors or motion sensors.

10. The device of claim 1, wherein the fluid is one of gel, semi-flow liquid, water, alcohol, oil, fruit extract, fragrance or organic compounds.

11. The device of claim 1, wherein the fluid contains disc like colloidal material to simulate flow in tubes to generate capillary blood flow pattern.

12. The device of claim 1, further comprising a solar cell to power the device.

13. The device of claim 1, further comprising an inlet for trapping organisms, wherein the inlet is defined through the device body and comprises:

one or more hair like projections that are mounted on a wall of the inlet.

14. The device of claim 13, wherein the wall of the inlet comprises a top wall of the inlet, a bottom wall of the inlet, a left wall of the inlet, and a right wall of the inlet, and the one or more hair like projections are mounted on at least one of the top wall of the inlet, the bottom wall of the inlet, the left wall of the inlet, the right wall of the inlet or a combination thereof.

15. An organism trapping device for trapping organisms, the device comprises:

a. a vibration wave generator, configured to generate vibration waves having a frequency ranging from 1.00 to 1.67 Hz;

b. an inciting engine, communicatively coupled with the vibration wave generator, and configured to generate signals representing vibration parameters based on the frequency of the generated vibration waves;

c. a walled container operatively coupled with the inciting engine and adapted to contain fluid and receive the generated signals to simulate flow of blood to attract one or more organisms towards the device;

d. an inlet defining an entry path into the device, the inlet comprising one or more hair like projections mounted on a combination of a top wall, a bottom wall, a left wall, and a right wall of the inlet, wherein the one or more hair like projections are configured to permit one-way entry of the one or more organisms into the device via the inlet and to trap the one or more organisms inside the device by preventing exit via the inlet;

e. one or more sensors disposed at the inlet, the one or more sensors configured to sense the entry of the one or more organisms into the device;

f. a processor communicatively coupled with the one or more sensors;

g. a fumigating agent communicatively coupled with the processor, wherein the processor is configured to activate the fumigating agent based on a signal received from the one or more sensors to compress the one or more organisms that have entered the device; and h. a device body, wherein the vibration wave generator, inciting engine, walled container, one or more sensors, processor, and fumigating agent are operatively connected to the device body and the inlet is defined through the device body.

* * * * *